June 22, 1926.

F. F. HILLIX 1,589,966

SEWING MACHINE DRIVE PULLEY

Filed August 29, 1924

Inventor

Foster F. Hillix,

By Bates, Macklin, Goldrick & Teare

Attorneys

Patented June 22, 1926.

1,589,966

UNITED STATES PATENT OFFICE.

FOSTER F. HILLIX, OF CLEVELAND, OHIO, ASSIGNOR, BY MESNE ASSIGNMENTS, TO WHITE SEWING MACHINE CORPORATION, OF CLEVELAND, OHIO, A CORPORATION OF DELAWARE.

SEWING-MACHINE DRIVE PULLEY.

Application filed August 29, 1924. Serial No. 734,880.

This invention relates to a friction wheel adapted to have a resilient contact with the driven member. An illustration of a particularly advantageous use is the mounting of it upon the armature shaft of a small motor acting to drive the fly wheel of a sewing machine.

An object of the invention is to provide a simple friction wheel capable of being cheaply manufactured, and which shall be very durable in use, retaining its shape, uniformity and resiliency for a long period. In making such wheels it has been customary to mount a rubber disc or body upon a suitable ferrule or bushing between radial flanges. The difficulties have been that the resilient material did not maintain a true uniform surface, particularly when rotated at very high speeds, nor did it long retain an even contact with the surface of the driven member. I have found that if the body of such a wheel or resilient material, such as rubber, is put under considerable compression and the radial and transverse stresses equalized near the driving face, and made very great comparatively, that the surface of such a wheel can be maintained under a constant stress throughout its life. The result will be permanently true uniformity of contact surfaces, and excellent frictional or gripping effect and great wearing life.

The above and other advantages will become apparent from the following description relating to the drawings which illustrate a preferred embodiment of this present invention. The essential characteristics of my invention are summarized in the claims.

Figure 1:
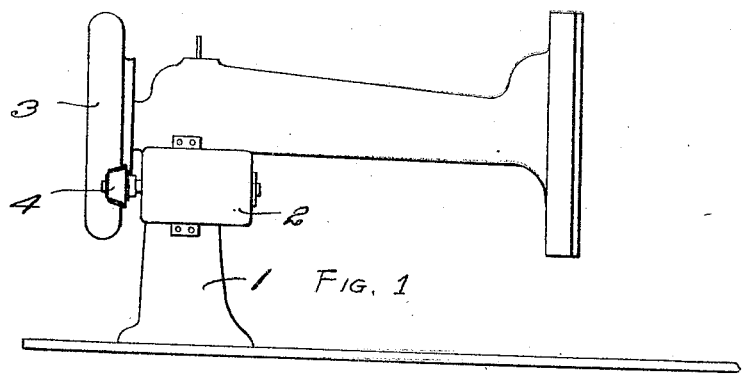
Figures 2, 3:
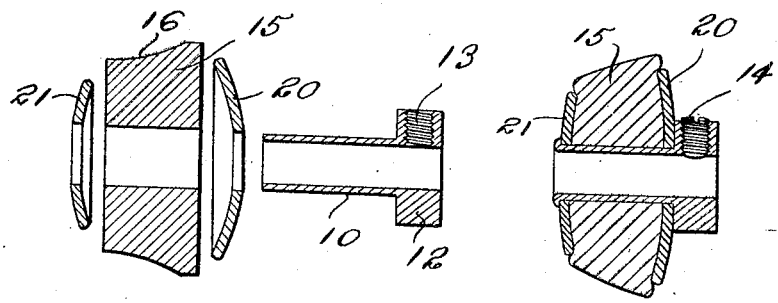
Figures 4, 5:
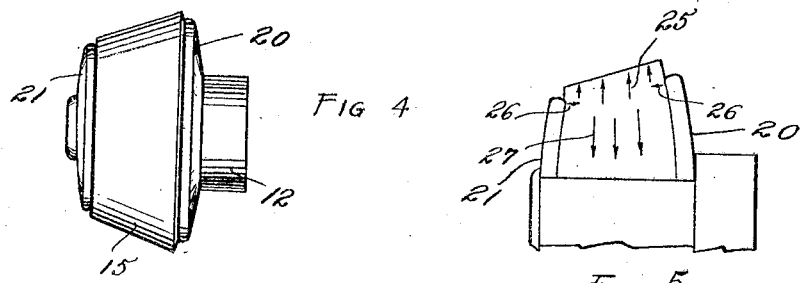

In the drawings Fig. 1 is a diagrammatic side elevation of a sewing machine head illustrating a motor carrying on its armature shaft such a wheel in contact with the hand wheel of the sewing machine; Fig. 2 is a front sectional view of the parts of the wheel before assembling; Fig. 3 is a similar view with the parts brought together; Fig. 4 is an outside elevation of my completed wheel; Fig. 5 is a diagrammatic view illustrating the effect of the radial and transverse forces resulting from compression.

Referring to the drawings by the use of numerals, 1 indicates a sewing machine; 2 a suitable motor mounted upon the side thereof; 3 is the usual hand wheel mounted upon the armature shaft of the motor and in contact with the surface of the hand wheel 3. My friction wheel as shown has a suitable ferrule or sleeve 10 adapted to embrace an armature shaft and having an enlarged head 12 with a radial opening threaded as at 13 to receive a suitable clamping screw 14, adapted to secure the pulley at its desired position on the armature shaft. 15 indicates a thick disk of suitable resilient material, such as rubber or the like. Its periphery may have any suitably shaped surface, here indicated in Fig. 2 as concave. The flanges 20 and 21 are shown as suitable saucer or disk-shaped washers adapted to fit closely upon the ferrule 10 and embrace the resilient material. As the washers are brought together upon the sides of the rubber, as indicated at Fig. 3, they are pressed very forcibly against the same, causing the rubber to bulge outwardly as indicated, into a substantially conical position which preferably is normally slightly concave, the rubber naturally pressing outwardly over the periphery of the inturned edges of the flanges 20 and 21, as shown. Subsequent slight trimming of the material brings it to a more regular and true surfaces indicated at Fig. 4.

In Fig. 5 I have shown radial arrows 25 indicating the pressure of the resilient material tending to cause it to flow outwardly due to the transverse compression forces between the inturned edges of the flange members 20 and 21, which forces are indicated by the arrows 25. The pressure away from the center is resisted by the tensional strength of the material located outside of the flanges which is subjected to increased tensional stress as the pressure between the flanges is increased. A condition is reached where the forces are balanced leaving the circumference of the pulley under a very much stressed condition. It is imperative that the circumferential stress set up in the surface is great enough that at no time will the centrifugal force set up by the rotation of the pulley at high speeds distort the pulley from its original accurate shape. At the same time inwardly acting forces are set up by the wedging action of the concave side members, establishing the balance of this outward pressure, after the rubber has assumed substantially the position indicated in Fig. 3. This, by the way presents a substantially uniform outer surface. The body is caused to fill the dished inner sides of the flanges by reason of the pressure by which they are brought together on it. This inwardly acting force, as indicated by the arrows 27 which establishes a substantial balance of the static condition of the compressed rubber directly between the peripheral inner edges of these flange members. It will be noted that the flanges are nearly coextensive with their respective sides of the body so that the driving surface is substantially that of the point of balanced force resulting from this compression of the resilient material of the body.

If the periphery of the body is originally curved inwardly as shown at 16, it may be brought to a substantially true frustro-conoidal surface. Should another surface, such as a true regular surface be desired, it is a very simple matter to cut or grind the body after assembling the wheel while spinning it rapidly and such a process will still leave the surface of this material under compression at all times throughout the period of its use. Thus, the properties of the true surface and the highly desirable frictional effect of such a stressed material and the much greater wear of which it is capable, are accomplished.

The conditions described may be set up in a wheel suitable for driving a sewing machine and being approximately one inch in diameter. For example, by bringing the discs together upon the rubber material used and securing them while subjected to a pressure of say three hundred to three hundred and fifty pounds. The material used is known as a stock composition similar to that of tire treads and the like but, of course, both the materials and the pressures may be varied according to the conditions desired and the size of the wheel to be made. When the discs are secured, as described, a more accurate true running wheel may be obtained by grinding, that is, by removing a few thousandths of an inch of the body of the resilient stock, while rotating the wheel at a high speed on a true running arbor. This insures that the wheel will be accurate and the grinding may be done at substantially the same speed at which the wheel will be later used.

Another advantage of this invention is the bringing together of the side members with their inwardly facing concave surface so that a portion of the material being urged inwardly causes a very close tight fitting engagement of the material with the hub member 10, and this with the very tight grip of the edges of the concave flanges as described is entirely adequate to prevent relative rotation of the body and hub, and the necessity for an angular hub or for a key or like securing means is eliminated.

Having thus described my invention, I claim:

1. A friction drive wheel having a hub, a body of resilient material fitted over the hub, and concave side securing flange members forcibly pressed against the material and secured in that position so that the resilient material is under great compression directly between peripheries of the flange members, while the outward and inward radial forces are balanced substantially at the periphery of the body and the resilient material is at all times under stress.

2. A friction wheel consisting of a hub, a body of resilient material fitted over the hub, and inwardly turned flange members at each side of the hub forced against the body material to distort it inwardly and outwardly causing great compression between the edges of the flange members, and causing a very firm gripping of the material between flanges and hub, whereby the body has a static condition of stress.

3. A friction wheel consisting of the hub, a body of resilient material fitted over the hub, and inwardly turned flange members forced against the sides of the body material to distort it inwardly and outwardly, causing great compression between the edges of the flange members and the body material extending but a slight distance beyond the edges of the flanges, whereby a static condition of stress is maintained substantially at the surface of the body.

4. A friction drive wheel consisting of a hub, resilient material embracing the hub, and side disc-like members concave on their inner surfaces mounted on the hub and extending outwardly therefrom substantially to the periphery of the body and forcibly pressed against the body to cause the material to expand outwardly and be pressed inwardly against the hub, and means for retaining the flanges in position to maintain this compression, the periphery of the body presenting an even driving surface under compression.

5. A friction drive wheel consisting of a hub, a body of resilient material embracing the hub, inwardly concave flange members mounted on the hub and extending outwardly therefrom forcibly pressed against the body to cause the material to expand outwardly and to be forced inwardly against the hub, means for securing the flanges in the position compressing the body material, the periphery of the body presenting a regular surface at all times under compression, the side flange members and the body being substantially coextensive at the respective sides.

In testimony whereof, I hereunto affix my signature.

FOSTER F. HILLIX.